Dec. 25, 1951  H. A. QUIST  2,580,320
LIQUID SURFACE SENSING DEVICE
Filed Dec. 1, 1948
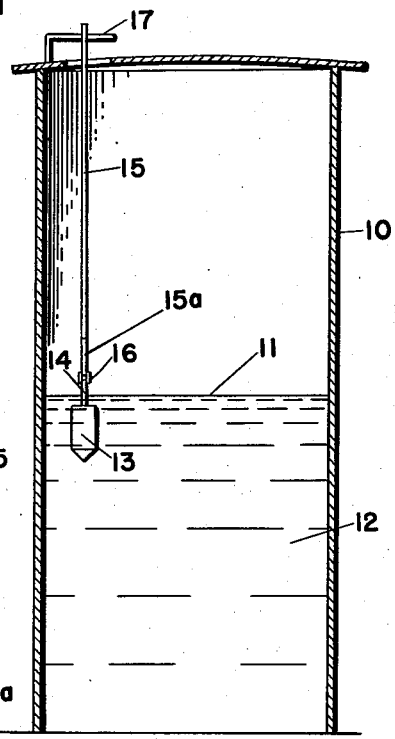
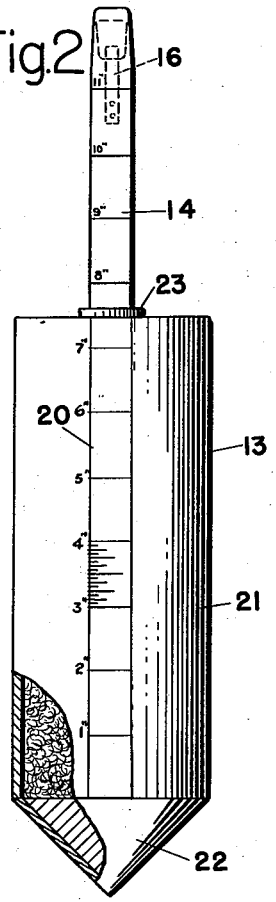
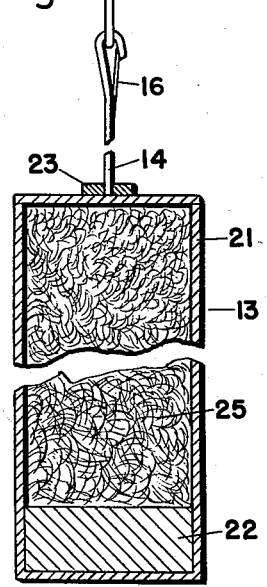
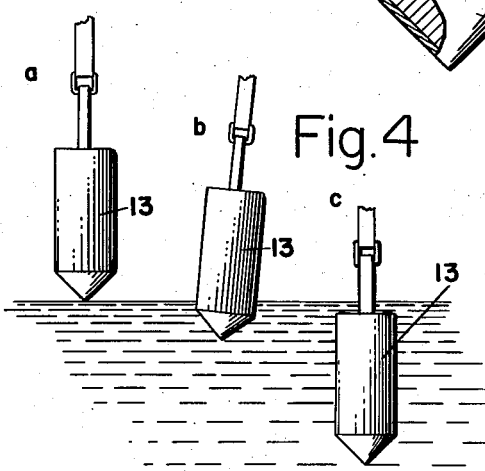
INVENTOR.
HAROLD A. QUIST
BY
Attorneys Patented Dec. 25, 1951

2,580,320

UNITED STATES PATENT OFFICE 2,580,320

LIQUID SURFACE SENSING DEVICE

Harold A. Quist, Elkton, Md., assignor to Sun Oil Company, Philadelphia, Pa., a corporation of New Jersey Application December 1, 1948, Serial No. 62,857

5 Claims. (Cl. 33—126.5)

This invention relates generally to liquid surface sensing devices and more particularly to apparatus for gauging the contents of liquid storage tanks.

The determination of the liquid contents of storage tanks such as those in oil refineries, chemical plants and the like where it is necessary to periodically ascertain liquid quantities in bulk, is primarily a manual operation. This is true notwithstanding many mechanical devices which have been introduced into this field. The tank gaugers, using portable measuring tapes and weighting bobs, are required to watch the liquid surface which they are measuring to determine the contact of the bob by the ripples of the liquid in order that they may obtain a quick and accurate reading without too great a wetted area on the tape line. Under these conditions and with the present liquid level measuring bobs, there is no way of sensing the liquid level other than by visual observation. To some long skilled in taking such measurements, there is a slight loss in weight when the heavy bob enters the liquid. This is difficult to ascertain and cannot be relied on. It is, therefore, the primary object of this invention to disclose apparatus which indicates the level of a body of liquid by an immediate and perceptible loss of weight, yet continues the gauging operation.

A further object is to disclose a liquid gauging device which increases the speed of such operations by indicating contact of the measuring device on entrance into the liquid.

Another object is to disclose a manually operated gauging device for the liquid contents of storage tanks which is highly portable and gives rapid and accurate results.

These and other objects will be more readily understood by reference to the following discussion and drawings in which:

Figure 1 is an elevation, partly in section, of a storage tank with the gauging apparatus in place, Figure 2 is an elevation of the bob, Figure 3 is an elevation of another form of the bob, Figure 4 is an elevation of the surface sensing device in the stages of liquid contact during the operation of the apparatus.

Figure 1 shows a liquid storage tank 10 in sectional elevation with the level 11 of the liquid contents 12 above the liquid surface sensing device or bob 13 at the close of a measuring operation. The detailed procedure which leads up to this position will be fully explained in the following. A short length of graduated tape 14 which is permanently fastened to the bob 13 is in turn attached to the suspending member 15 and 15a by a fastening device such as the spring snap 16 shown. The suspending member 15 is preferably a flexible, metallic tape arranged so that the graduations are reversed, the highest graduation being adjacent the lower segment of the suspending member noted as 15a and the lowest next to the top of the tank. The reason for this arrangement will be understood from the example used in disclosing the operation of the device. A datum point 17 is established above the tank to be measured at a known height above the bottom of the tank which is the depth of the liquid plus the distance from the liquid level when full, to the datum. It may be either attached to or separated from the tank as desired. An ungraduated segment of flexible connector 15a is inserted between the highest graduation on the suspending tape and the bob extension 14 to allow for the interval between the highest liquid level and the datum 17.

Figure 2 shows the liquid surface sensing bob 13 in its preferred form with graduations 20 numbered upward from the juncture of the cylinder wall 21 with the conical weighted section 22. This is an arbitrary starting point for the graduations and is taken as the preferred embodiment because of the added flexibility in obtaining readings with the minimum amount of wetted surface on the bob. One form of the bob 13 is entirely without graduations on the outside surface with the graduations confined to the bob extension tape 14 starting at the point where it is attached to the upper surface of the cylinder at the fastening 23. This is particularly advantageous where other geometrically shaped bodies such as spheres, oblate spheroids, etc., are used which are difficult of actual graduations for submergence. That other shapes of the liquid surface sensing device may be used appears to be readily understood. The cylindrical form is shown here, and preferably used, because it is more readily transported by the gauger and does not require too large an opening for insertion into the tank to be gauged. Then, too, it is more easily manufactured and maintained.

A modification of the liquid surface sensing bob 13 is shown in Figure 3. The cylindrical shell 21, which is preferably metal but may be made of other rigid materials such as plastic, hard rubber or even impregnated wood, is shown filled with a material 25 of very low specific gravity and high reinforcing strength. One such material is a commercially available product known as foam glass. Others may be used and give as satisfactory results. The reason for using a filler of this nature is to achieve the result sought for such a device which is a great percentage of change in the submerged weight as compared to its weight in air. A solid body of high specific gravity will not have as great a percentage of weight loss on immersion as will that of a low specific gravity solid. Although the cylinder may be filled with air or other gas, the changes in temperature causing expansion and contraction would unduly stress the cylinder material. It will be understood that although a hollow surface sensing body is preferred if it be made of sturdy and wear resistant materials, a solid body, proportioned properly and in accord with this invention, may also be used. Such a member could be made of cork, balsa wood, or like materials properly impregnated and weighted to produce the required specific gravity relationship. If properly designed, there is no limit to the materials, light or heavy, which can be used for the bob member.

As an example of one form of cylindrically shaped sensing bob which was fabricated and used, a closed cylinder of sheet brass 0.020 inch thick was filled with foam glass. This cylinder was nine inches high and three inches outside diameter. A conically shaped lead weight 1¾ inches in altitude was attached to the bottom. The flexible tape extension 14 was attached to the upper surface of the cylinder as already described. The weight of the total arrangement in air was 2.625 pounds. When used to determine the volume of gasoline in a tank, it displaced 1.75 pounds of the liquid which gives an immersed weight of the cylinder equal to 0.875 pound. Thus, the bob lost 67% of its weight in air when submerged in the gasoline. This change in weight is easily sensed by the gauger and gives an immediate knowledge of the presence of the liquid surface.

Returning to Figure 3, the configuration of the preferred cylindrical form of the surface sensing bob 13 is retained, but the weight 22 is shown as a mass in the bottom of the cylinder. As the purpose of the weight is to keep the bob 13 upright in alignment with the suspending member 15 and the bob extension 14 and submerge this member so as to obtain a wetted area on the bob and tape for gauging purposes, it may be a part of the bob as shown or affixed by any other means such as a detachable connection.

Although the operation will be clear from the detailed discussion of the parts of the apparatus and the example of a sample device noted above, a clearer understanding of the use for which the apparatus is designed will be obtained by following a gauging operation in detail. Reference is made to all the figures in the drawing and in particular to Figure 1. The form of surfacing sensing bob 13 is preferably the hollow cylindrical member filled with foam glass and with the conical lead weight affixed to the bottom cylinder surface. The outer surface of the cylinder is graduated in inches increasing upwardly from the lower end of the cylinder wall adjacent the juncture with the conical weight. The extension tape 14 is fastened at 23 to the upper end of the cylinder and exactly continues the graduations on the cylinder wall for a convenient distance to the spring clip 16. The length of the combined graduated bob 13 and bob extension 14 is sufficient to include all the gauging operations as explained later.

The gauger carries the gauging device described to the top of a tank and opens the gauging hole which is immediately beneath the datum 17. The surface sensing bob 13, Figure 1, is inserted and lowered into the tank by means of a graduated suspending member 15, usually a flexible tape. In Figure 4 the contact positions a, b and c show the entrance of the bob 13 into the liquid with the consequent slackening on the suspending member which indicates the loss of weight in air and immediately indicates surface contact in the normal operation. The successive positions of the sensing bob assuming a submerged position with the consequent tightening of the measuring tape are shown. The gauger then places the nearest foot mark on the suspending tape 15 at the datum point 17, and reads the graduation. He then pulls up the bob and reads the wetted mark either on the bob 13 or the bob extension 14. As the tape is reversed, he adds the wetted dimension to his first reading at the datum point and obtains directly the depth of the liquid in the tank. Reference to mathematical tables gives the liquid volume.

A numerical example following the above procedure is given to clarify the reversed tape arrangement and also indicate one length of the bob extension tape 14 which will prove satisfactory. Although the graduations of the bob 13, tape 14 and suspending member 15 are not coordinated due to the insert 15a which varies with differences in the elevation of datum 17 above the height of liquid when the tank is full, it is desirable to have the tape 14 long enough to cover the maximum number of readings and the consequent wettings in the measured liquids. This will permit the use of a less expensive suspending member and the concentration of highly serviceable material in that portion of the apparatus receiving the deteriorating action of the liquids which are measured. As the gauger places the suspending member 15 which he holds against the datum 17 on sensing the liquid contact, this would occur at a maximum of one foot above the top of the surface sensing member 13. Hence, a bob extension 14, twelve inches long, would be satisfactory. If the graduated bob 13, as disclosed in the preferred embodiment, and this example were used, this would be approximately nineteen inches above the base of the cylinder wall.

The graduations read upwardly on the liquid sensing bob and on the connecting tape 14 adjacent the sensing member, whichever form is used, and the zero point on the suspending member 15 would appear at the datum point 17 when the storage tank is empty. As an example, let us consider the datum point as established to measure a liquid depth of fifty feet above the bottom of the tank. The highest graduation, that is fifty feet, would appear on the tape 15 adjacent datum 17 when the tank is full. As the insert 15a is constant the varying depths of liquid in the tank from empty to full will be reflected by the foot graduation matched against the datum 17. The intervening fractions of a foot will be measured by the wetted depth on the bob 13 and extension 14. It is assumed that the tank has twenty-five feet, six inches of liquid in it and the gauger is to verify that depth. He lowers the gauge into the tank and senses the liquid surface just before the twenty-five foot mark on the suspending member reaches the datum point. He places the twenty-five foot graduation on the datum point, the weighted bob holding the suspending member taut. On pulling up the surface sensing bob, he reads a wetted elevation of six inches which is added to his twenty-five foot reading giving the exact depth of the liquid.

If the wetted depth on the tape and bob exceeded one foot over all, the reading at the datum point would have been one foot less as the tape is reversed and the addition of the wetted dimension will give the correct result. In the example above, if the twenty-five foot mark on the tape had been missed, the next lower foot reading to be used on the descending graduations of the tape would be twenty-four feet. The bob will draw the suspending member tight and when pulled up will show eighteen inches of wetted area. This, added to the twenty-four feet datum point reading, will give the result stated above.

Use of the non-graduated surface sensing bob may require regauging if the surface is sensed by the gauger before the bob has submerged so as to wet the bob extension tape 14. This, however, is not the determinative value of the spirit of the invention if the user wishes to use either the non-graduated cylinder or another geometrically shaped solid for other reasons. It is obvious that the construction and arrangement of the parts may be varied in many ways without departing from the scope of the appended claims.

I claim:

1. In combination with a tank for holding liquids, a gauge for determining the volume of liquid comprising a datum mounted above the top of the maximum liquid level therein; a liquid surface sensing device including a bob proportioned to displace a large volume of liquid in relation to weight and having a specific gravity greater than the liquid, a flexible extension attached to said bob; graduations for measuring on said sensing device calibrated in ascending scale from the bottom thereof; and a suspending member adapted to engage said flexible extension and cooperate with the datum point graduated in descending scale from the highest reading adjacent said sensing device.

2. In combination with a tank for holding liquids, a gauge for determining the volume of liquid comprising a datum mounted above the top of the maximum level therein; a liquid surface sensing device including a hollow bob shaped to displace a large volume of liquid in relation to weight, a discrete solid filler of low specific gravity and high reinforcing strength in said hollow bob to maintain the shape thereof under pressure, a weight on said bob to operably direction the device and increase the specific gravity thereof over that of the measured liquid; and a graduated tape adapted to suspend said member in liquid surface measuring relation with said datum.

3. In combination with a tank for holding liquids, a gauge for determining the volume of liquid comprising a datum mounted above the top of the maximum level therein; a liquid surface sensing device including a rigidly formed hollow bob shaped to displace a large volume of liquid in relation to weight, a low specific gravity discrete solid filler of high reinforcing strength in said hollow bob to preserve the shape thereof under pressure, a weight forming a part of said bob positioned to operably align the same and increase the specific gravity of the device over that of the measured liquid; and graduated flexible means secured to said member for suspending the same in liquid surface sensing relation with said datum.

4. A liquid surface sensing device comprising a hollow bob shaped to displace a large volume of liquid in relation to weight, a discrete solid filler of low specific gravity and high reinforcing strength in said hollow bob to maintain the shape thereof under pressure, a weight on said bob to operably direction the device and increase the specific gravity thereof over that of the measured liquid, and graduated flexible means secured to said member for suspending the same in liquid surface sensing relation with said datum.

5. A liquid surface sensing device comprising a rigidly formed hollow bob shaped to displace a large volume of liquid in relation to weight, a low specific gravity discrete solid filler of high reinforcing strength in said hollow bob to preserve the shape thereof under pressure, a weight forming a part of said bob positioned to operably align the same and increase the specific gravity of the device over that of the measured liquid, and graduated flexible means secured to said member for suspending the same in liquid surface sensing relation with said datum.

HAROLD A. QUIST.

REFERENCES CITED

The following references are of record in the file of this patent:

UNITED STATES PATENTS

| Number | Name | Date |
|---|---|---|
| 1,498,960 | Gardner | June 24, 1924 |
| 2,226,060 | Johnson | Dec. 24, 1940 |
| 2,284,396 | Pfeiffer | May 26, 1942 |
| 2,295,218 | Jurs | Sept. 8, 1942 |

FOREIGN PATENTS

| Number | Country | Date |
|---|---|---|
| 722,362 | France | Dec. 29, 1931 |